United States Patent
Goller (10) Patent No.: US 10,361,627 B1
(45) Date of Patent: Jul. 23, 2019

(54) REDUCTION OF LOW FREQUENCY NOISE IN A DISCRETE SPREAD SPECTRUM TIMEBASE

(71) Applicant: TEXAS INSTRUMENTS INCORPORATED, Dallas, TX (US)

(72) Inventor: Joerg Erik Goller, Tiefenbach (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/129,347

(22) Filed: Sep. 12, 2018

(51) Int. Cl.
| | |
|---|---|
| *H02M 3/335* | (2006.01) |
| *H02M 1/44* | (2007.01) |
| *G06F 7/58* | (2006.01) |
| *H02M 3/158* | (2006.01) |
| *H04B 1/7075* | (2011.01) |

(52) U.S. Cl.
CPC ............. *H02M 1/44* (2013.01); *G06F 7/584* (2013.01); *H02M 3/1584* (2013.01); *H04B 1/70756* (2013.01); *H02M 2003/1586* (2013.01)

(58) Field of Classification Search
CPC .... H02M 3/156; H02M 3/33546; H02M 1/44; G05F 7/584
USPC ............ 363/21.06, 21.12, 21.18, 60, 95, 97; 323/282–285; 327/105, 115, 117, 147, 327/158, 162, 232
See application file for complete search history.

(56) References Cited

U.S. PATENT DOCUMENTS

| | | | | |
|---|---|---|---|---|
| 6,618,462 | B1 * | 9/2003 | Ross ........................ | G06F 7/68 |
| | | | | 327/115 |
| 7,046,064 | B1 * | 5/2006 | Runaldue .................. | H03L 7/06 |
| | | | | 327/237 |
| 7,362,191 | B2 * | 4/2008 | Chen ....................... | H02M 1/44 |
| | | | | 331/78 |
| 7,436,227 | B2 * | 10/2008 | Thomsen ................ | H03L 1/022 |
| | | | | 327/147 |
| 2016/0118905 | A1 * | 4/2016 | Freeman ........... | H02M 3/33546 |
| | | | | 363/21.1 |

OTHER PUBLICATIONS

Tao et al., "PWM Control Architecture With Constant Cycle Frequency Hopping and Phase Chopping for Spur-Free Operation in Buck Regulators," IEEE Transactions on Very Large Scale Integration (VLSI) Systems, vol. 21, No. 9, Sep. 2013, pp. 1596-1607.
Wikipedia, "Spread Spectrum," 5 p. [Online] https://en.wikipedia.org/wiki/Spread_spectrum#Spread-spectrum_clock_signal_generation.

* cited by examiner

*Primary Examiner* — Rojnikant B Patel
(74) *Attorney, Agent, or Firm* — Tuenlap Chan; Charles A. Brill; Frank D. Cimino (57) ABSTRACT

An integrated circuit. The integrated circuit comprises a timebase generator and a switch mode direct current-to-direct current (DC-to-DC) voltage converter coupled to the timebase generator. The timebase generator comprises a first linear feedback shift register (LFSR), a signal generator having an input coupled to an output of the first LFSR; and a digital divider comprising a second LFSR and a programmable digital divider, wherein a clock input of the programmable digital divider is coupled to an output of the signal generator, wherein an output of the programmable digital divider is coupled to a clock input of the first LFSR and is coupled to a clock input of the second LFSR, and wherein an output of the second LFSR is coupled to a program input of the programmable digital divider.

20 Claims, 8 Drawing Sheets

REDUCTION OF LOW FREQUENCY NOISE IN A DISCRETE SPREAD SPECTRUM TIMEBASE

BACKGROUND

Direct current-to-direct current (DC-to-DC) converters find many applications in electronic devices. For example, DC-to-DC converters are used in mobile electronic devices to convert battery power to different voltage levels specified by different integrated circuits in the device. Some DC converters receive an input DC voltage and step it down to a lower DC voltage. Some DC converters receive an input DC voltage and step it up to a higher DC voltage. Some DC converters are configurable or controllable to both step up and step down DC voltage. In some cases, the operation of these DC-to-DC converters is based on switching circuit operation modes and hence these switch mode DC-to-DC converters rely on a timebase generator to control the switching frequency.

SUMMARY

In accordance with at least one example of the disclosure, an integrated circuit. comprises a timebase generator and a switch mode direct current-to-direct current (DC-to-DC) voltage converter coupled to the timebase generator. The timebase generator comprises a first linear feedback shift register (LFSR), a signal generator having an input coupled to an output of the first LFSR; and a digital divider comprising a second LFSR and a programmable digital divider, wherein a clock input of the programmable digital divider is coupled to an output of the signal generator, wherein an output of the programmable digital divider is coupled to a clock input of the first LFSR and is coupled to a clock input of the second LFSR, and wherein an output of the second LFSR is coupled to a program input of the programmable digital divider.

In accordance with at least one example of the disclosure, a system comprises an integrated circuit. The integrated circuit comprises a timebase generator and a switch mode direct current-to-direct current (DC-to-DC) voltage converter coupled to the timebase generator and configured to output a DC power based on the timebase generated by the timebase generator. The timebase generator comprises a first linear feedback shift register (LFSR) configured to generate a sequence of timebase control words based on a previous value of the timebase control word and in response to a divided timebase received by a clock input of the first LFSR, a signal generator coupled to the first LFSR and configured to generate a timebase of the timebase generator based on the timebase control words, and a programmable digital divider coupled to the signal generator and to the first LFSR and configured to generate the divided timebase by dividing the timebase by a varying integer value determined based on a program input of the programmable digital divider.

In accordance with at least one example of the disclosure, a method of operating a switch mode direct current to direct current (DC-to-DC) voltage converter, comprises outputting a timebase control word from a first linear feedback shift register (LFSR) configured to produce a sequence of different timebase control word values based on a previous value of the timebase control word and in response to a divided timebase received by a clock input of the first LFSR, generating a timebase by a signal generator based on the timebase control word, dividing the timebase by a programmable digital divider based on an integer value programmed into the programmable digital divider to generate the divided timebase, changing the integer value programmed into the programmable digital divider based on the divided timebase.

BRIEF DESCRIPTION OF THE DRAWINGS

For a detailed description of various examples, reference will now be made to the accompanying drawings in which.

DETAILED DESCRIPTION

Switch mode DC-to-DC converters rely on switching a circuit mode of operation, wherein the switching is inherent to producing an output DC voltage that is independent from the voltage level of the input DC voltage. In an example, this switching causes an undesirable noise spur at the switching frequency that can be detected at various points in the switch mode DC-to-DC converters—in the input voltage, in internal points within the converters, and at the output voltage. This noise spur interferes with electronic device and system performance, both performance within the switch mode DC-to-DC converter and performance of electronic devices receiving the DC voltage output by the switch mode DC-to-DC converter.

To solve the foregoing problem, the present disclosure teaches dithering or shifting the frequency of the switching in a pseudo-random pattern that spreads the switching noise across a range of frequencies, thereby lowering the amplitude of switching noise at any one frequency. In an example, a linear feedback shift register (LFSR) is used to generate a sequence of N-bit values that repeats continuously. In examples, a LFSR is used to generate a sequence of $2^{(N)}-1$ different N-bit values. Because in some examples the values produced by the LFSR are pseudo-randomly distributed and none of the values are repeated in a cycle of the LFSR, a modulation controlled by the above mentioned sequence of values generated by the LFSR does not introduce an additional low frequency noise source into the switch mode DC-to-DC converter. The output values of the LFSR (e.g., a timebase control word) drive a control that varies the switching frequency of the switch mode DC-to-DC converter in a narrow range of frequencies around a target switching frequency. To achieve design objectives of switch mode DC-to-DC converters, an optimal or target switching frequency is defined, and switching at a frequency too far different (e.g., beyond a threshold) from that target switching frequency degrades performance of the switch mode DC-to-DC converter unacceptably. The framework for reducing switching noise described herein has application to reducing switching noise in clock generator chips as well, for example in environments where cycle-to-cycle jitter can be tolerated better than switching noise. The switching signal is referred to as a timebase signal.

As an enhancement to this technique of reducing switching noise in a switch mode DC-to-DC converter, the timebase signal is fed back into a digital divider, and an output of the digital divider clocks the LFSR or causes the LFSR to cycle to its next state. The digital divider is configured to divide the timebase signal by an integer value that varies pseudo-randomly during operation of the switch mode DC-to-DC converter. The time interval at which the LFSR changes the timebase control word introduces noise and/or electromagnetic interference (EMI) in the switch mode DC-to-DC converter at a frequency associated with the time interval of changing the timebase control word. By varying the integer division of the timebase signal (and hence varying the time interval of changing the timebase control word), this noise is spread in frequency, thereby reducing the amplitude of this noise at any specific frequency of changing the timebase control word. In an example, the digital divider comprises a programmable digital divider and a second LFSR. The programmable digital divider outputs a control signal to an input of the LFSR (e.g., a clock control input) and the input of the second LFSR. The output of the second LFSR is fed into the programming input of the programmable digital divider. The programmable digital divider has a clock input that is coupled to the timebase signal, and as the timebase signal cycles, the programmable digital divider divides the timebase signal by the integer number that has been programmed into it. This results in the programmable divider dividing the timebase signal by a pseudo-randomly distributed integer number, further spreading switching noise associated with the timebase signal.

Figure 1:
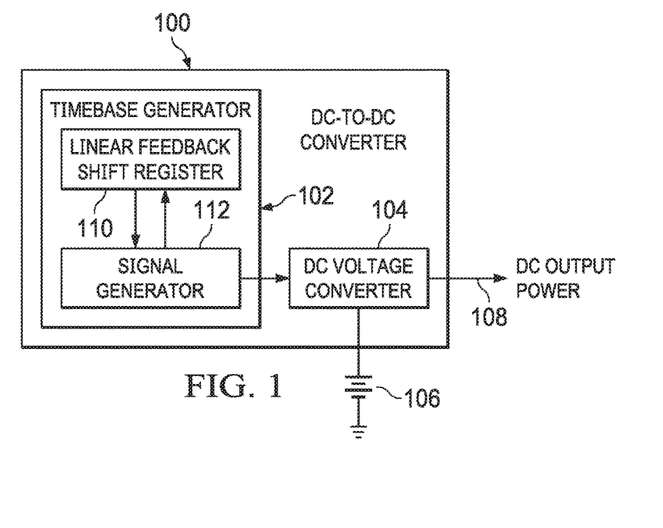
FIG. 1 shows a switch mode DC-to-DC converter integrated circuit (IC) in accordance with various examples.

FIG. 1 depicts an illustrative switch mode DC-to-DC converter integrated circuit (IC) 100. In an example, the switch mode DC-to-DC converter IC 100 comprises a timebase generator 102 and a DC voltage converter 104. The DC voltage converter 104 is connected to a battery 106 from which it receives DC power and it provides a DC output power 108. The timebase generator 102 generates a switching signal or timebase that is supplied to the DC voltage converter 104 to switch its power stage to perform its voltage conversion function. As used herein, a timebase signal refers to an electric signal that contains patterns or events. Such patterns or events can include a rising or falling edge of a pulse, a peak or minimum value of a triangular wave signal or sawtooth wave signal, a pulse width, or any other appropriate pattern or event.

The timebase generator 102 comprises a linear feedback shift register (LFSR) 110 and a signal generator 112. The LFSR 110 and the signal generator 112 are communicatively coupled to each other. The signal generator 112 provides a clock signal to the LFSR 110 that causes it to shift bits serially through its registers. In an example, the signal generator 112 also provides a switching signal from the timebase generator 102 for use by the DC voltage converter 104. The digital value stored by the LFSR 110 is output to the signal generator 112 and causes the switching signal output by the signal generator 112 to vary in switching frequency. The signal generator 112 also provides its output to the DC voltage converter 104, which, in turn, outputs a DC-converted output power signal 108 and couples to ground 106. In some contexts, the signal generator 112 is referred to as a timebase signal generator.

In an example, the LFSR 110 is a Fibonacci type of LFSR. In an example, the LFSR 110 is a Galois type of LFSR. In an example, the LFSR 110 is replaced with another component that generates a multi-bit sequence of pseudo-random numbers. Some of the output values of registers of the LFSR 110 are provided to the inputs of one or more logic gates (not shown in FIG. 1) to generate an input signal to an initial register of the LFSR 110. Because the LFSR 110 is clocked (e.g., the bit shifting within the LFSR 110 is controlled) by the output of the signal generator 112, the LFSR 110 and the signal generator 112 remain in synchronization. Said in other words, generation of a next pseudo-random pattern or value of the LFSR 110 (e.g., changing switching signal frequency) is based on the last clock edge that was generated.

Figure 2A:
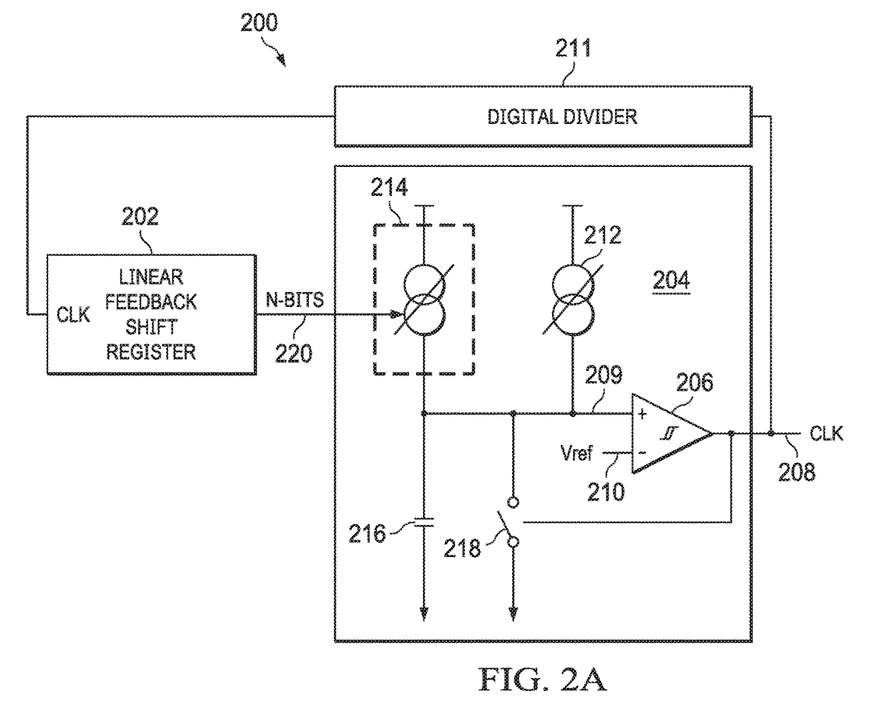
FIG. 2A shows a timebase generator in accordance with various examples.

FIG. 2A shows an illustrative timebase generator 200. In an example, the timebase generator 200 is used to implement the timebase generator 102 described above with reference to FIG. 1. In an example, the timebase generator 200 comprises a LFSR 202 and a signal generator 204. In an example, the LFSR 202 is a Fibonacci LFSR. In an example, the LFSR 202 is a Galois LFSR.

In an example, the signal generator 204 comprises a comparator 206 that outputs a high logic level as a clock signal 208 and/or timebase when a voltage on a first input 209 exceeds the voltage of a voltage reference provided to a second input 210. The timebase is used by the switch mode DC-to-DC converter IC 100 to switch. In some contexts, the signal generator 204 is referred to as a timebase signal generator.

The signal generator 204 further comprises a constant current source 212 and a varying current source 214, a capacitor 216, and a switch 218 (e.g., a transistor). A current output of the constant current source 212 and a current output of the varying current source 214 are coupled to a first lead of the capacitor 216. A second lead of the capacitor 216 is coupled to ground. The first lead of the capacitor 216 is also coupled to the first input 209 of the comparator 206. The output of the comparator 206 (e.g., clock signal 208) is coupled to a control lead of the switch 218. A first lead of the switch 218 is coupled to the first lead of the capacitor 216 and a second lead of the switch 218 is coupled to ground. When the switch 218 is closed, the first lead of the switch is connected to the second lead of the switch, and the first lead of the capacitor 216 is hence coupled to ground. When the switch 218 is open, the first lead of the switch is disconnected from the second lead of the switch 218. In an example, the output of the signal generator 204 is a clock pulse. The LFSR 202 is coupled to the comparator 206, for example coupled via the varying current source 214.

In an example, this clock signal 208 output by the signal generator 204 is fed back to a clock input of the LFSR 202 which controls when the LFSR 202 shifts and outputs a different n-bit pseudo-random number at 220. In an example, the output of the comparator 206 (which provides the clock signal 208) is coupled to the input of a digital divider 211, and the output of the digital divider 211 is coupled to the clock input of the LFSR 202. The digital divider 211 divides the clock signal 208 of the signal generator 204 by an integer. In an example, the digital divider 211 divides the clock signal 208 of the signal generator 204 by an integer multiple of 2. Thus, the digital divider 211 divides the clock signal 208 by one of 2, 4, 8, 16, 32, ..., $2^k$ where k is a positive integer value. In an example, the digital divider 211 divides the clock signal 208 by one of 3, 5, 6, 7, 9, 10, or another integer value. The digital divider 211, in an example, further contributes to decreasing switching noise in the switch mode DC-to-DC converter 100. The optional digital divider 211 has the effect of causing the signal generator 204 to maintain the same switching frequency for multiple cycles rather than changing on each cycle of the timebase.

The voltage at the first lead of the capacitor 216 and hence the voltage of the first input 209 ramps up as current produced by the constant current source 212 and varying current from the varying current source 214 is collected by the capacitor 216 (e.g., charging the capacitor 216). When the voltage at the first input 209 exceeds the voltage reference present at the second input 210 of the comparator 206, the comparator 206 outputs a logic high value on the clock signal 208. When the clock signal 208 is high, this causes the switch 218 to close and rapidly discharge the capacitor 216 to ground. As a result of discharging, the voltage at the first lead of the capacitor drops and hence the voltage at the first input 209 drops below the voltage reference coupled to the second input 210, and the output of the comparator 206 outputs a low logic level. The low logic level causes the switch 218 to open again, and allows the capacitor 216 to resume charging from constant current source 212 and varying current source 214.

If the varying current source 214 were not in the signal generator 204 or if it were turned off, the current charging the capacitor 216 would be constant, and the frequency of the clock signal 208 (and switching signal) would be a constant frequency. The output 220 of the registers of the LFSR 202 comprises an N-bit number that controls the varying current source 214 to produce more or less current as the N-bit number is larger or smaller. The output 220 of the registers of the LFSR 202 may be referred to as an N-bit timebase control word. In an example, the output 220 of the registers of the LFSR 202 modifies a timebase signal generated by the signal generator 204 in a binary weighted manner.

Figure 2B:
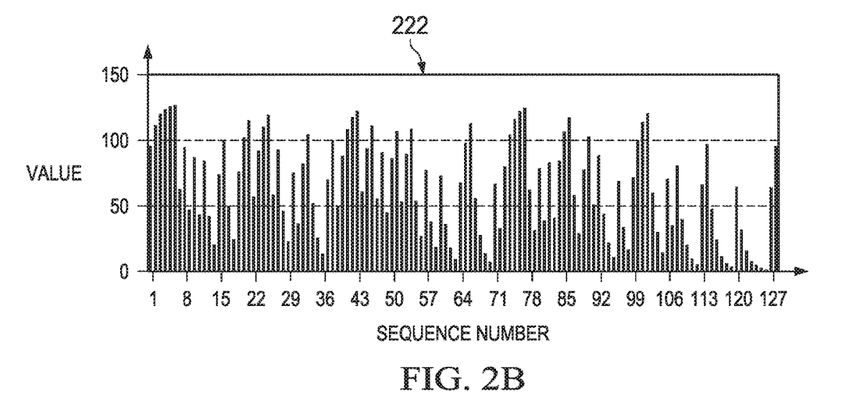
FIG. 2B shows a sequence of pseudo-random numbers generated by a linear feedback shift register (LFSR) in accordance with various examples.

In an example, the LFSR 202 comprises 7 registers and hence outputs a 7-bit number to the varying current source 214 from b0000001 to b1111111 (in this example b0000000 is an excluded value as well as in other examples). In an example, the sequence of pseudo-random numbers produced by the LFSR 202 is represented in graph 222 as shown in FIG. 2B. If a different initial seed value for the LFSR 202 were used, the sequence of pseudo-random numbers would start at a different point in the sequence. The LFSR 202 starts with an initial seed value at sequence step 1, it produces a different value at sequence step 2, it produces a different value at sequence step 3, and so on through different values between 1 and 127 through the remaining sequence steps to step 127. After sequence step number 127, the LFSR 202 again produces the initial seed value at sequence step 128. The numbers generated by the LFSR 202 are said to be pseudo-random because they are not truly random but deterministic based on the configuration of the LFSR 202 (e.g., how the inputs to the registers of the LFSR 202 are generated). The numbers generated by the LFSR 202 are also said to be pseudo-random because their values are generally randomly distributed between 1 and 127. In other examples, a different circuit or circuit component is used instead of the LFSR 202 to generate a sequence of pseudo-random values for use in creating an N-bit timebase control word.

The LFSR 202 is configured such that the 7-bit numbers output by its registers occur in a pseudo-random sequence, and that this sequence does not repeat any values until all 127 permitted values have been produced (although in some examples, it is possible for the sequence to include some repeated values). In an example this is referred to as a maximum length sequence of output values for the LFSR 202. Different LFSRs have different maximum length sequences associated with the number of registers the LFSR contains. For example, a maximum length sequence of a 9-bit Fibonacci LFSR is 511, and a maximum length sequence of an 11-bit Fibonacci LFSR is 2047. Not all LFSRs are maximum length LFSRs. In an example, the sequence length of an LFSR depends on a feedback path of the LFSR.

FIG. 2B shows a sequence 222 of pseudo-random numbers produced by the LFSR 202. A pseudo-random number is associated with each sequence number (e.g., the sequence of integers 1, 2, 3, ..., $2^N-1$). The pseudo-random number is not a linear function of its associated sequence number. The pseudo-random numbers are substantially randomly distributed over the sequence.

Figure 2C:
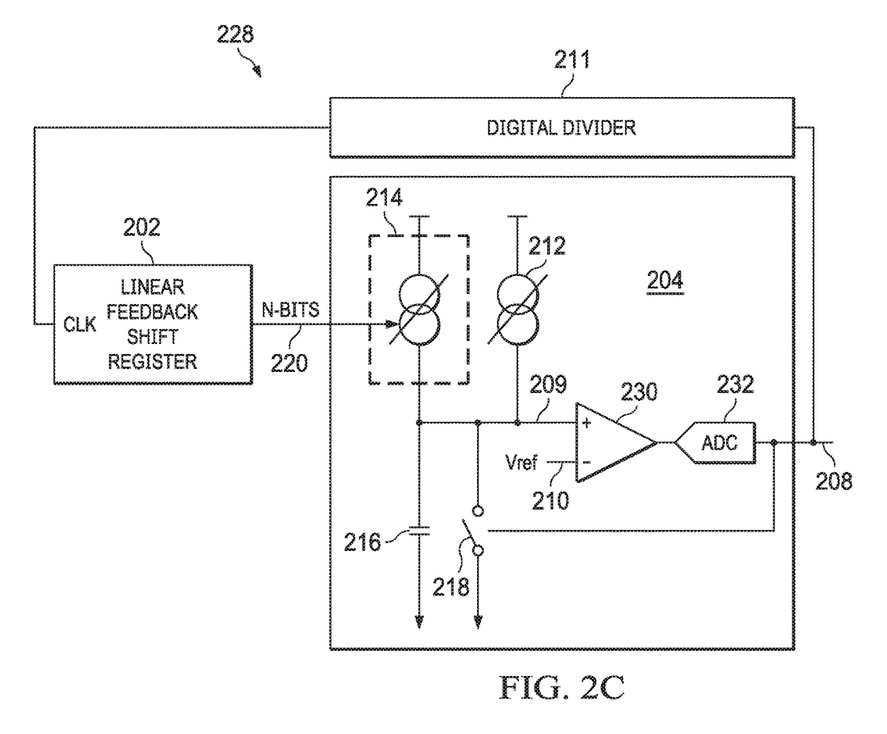
FIG. 2C shows another timebase generator in accordance with various examples.

FIG. 2C shows another illustrative timebase generator 228 that is an alternative example to the timebase generator 200 described above with reference to FIG. 2A. The timebase generator 228 is substantially similar to the timebase generator 200 described above, with the difference that the clock signal 208 is produced by the combination of a differential amplifier 230 and an analog-to-digital converter (ADC) 232. The differential amplifier 230 is coupled to the first lead of the capacitor 216 on its first input 209 and receives a voltage reference at its second input 210. The differential amplifier 230 outputs an analog signal that is based on its first and second inputs to the ADC 232, and the ADC 232 produces the clock signal 208 that feeds back into the LFSR 202 (possibly via digital divider 211) and to the switch 218.

The example implementations of the timebase generators 102, 200, 228 described herein provide one or more benefits. The timebase generators 102, 200, 228 occupy a small area on an integrated circuit. The timebase generators 102, 200, 228 are applicable to a wide variety of circuit designs. The timebase generators 102, 200, 228 promote starting and stopping without disrupting a system relying on the switching signal it outputs. The timebase generators 102, 200, 228 consume little power.

The signal generator 204 can take many forms that are different from the examples described above with reference to FIG. 2A and FIG. 2C. In an example, a signal generator generates a pulse-width timebase. In an example, a signal generator generates a minimum ON-time type of timebase or minimum OFF-time type of timebase. In an example, the signal generator 204 converts the timebase control word to a timebase signal in a different way, using different circuitry from the constant current source 212 and the varying current source 214. In an example, the timebase control word is processed by digital logic to generate the timebase signal in the digital domain. In an example, a different analog process is used to transform the timebase control word to generate the timebase signal. The disclosure contemplates a broad variety of mechanisms for receiving a command word in the form of a pseudo-random number generated by a LFSR and transforming this pseudo-random number into a timebase signal. The timebase signal is then used to control a switch of DC voltage converter 104.

Figure 3:
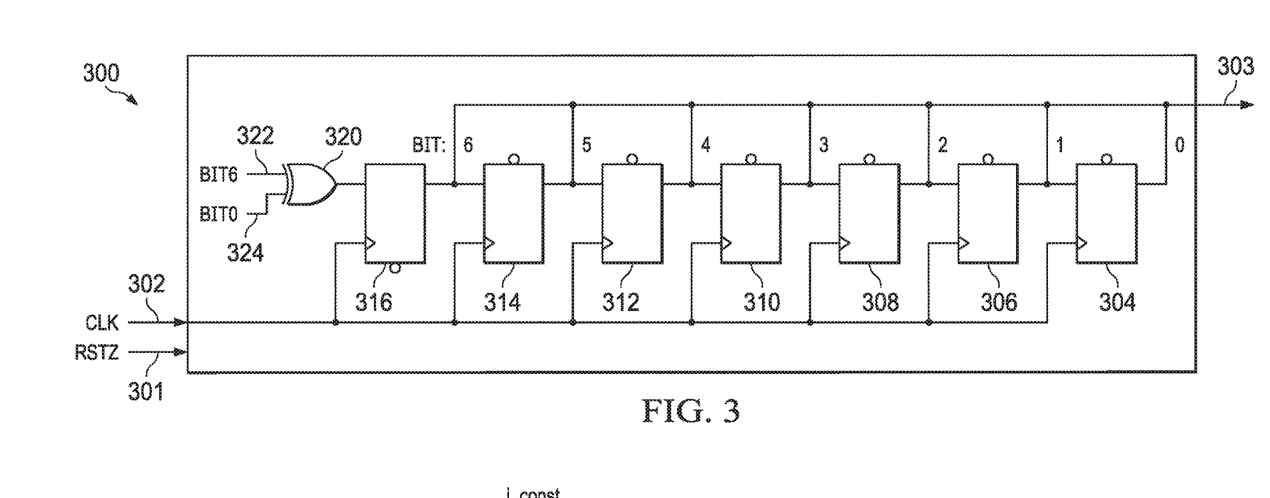
FIG. 3 shows a Fibonacci linear feedback shift register (LFSR) in accordance with various examples.

FIG. 3 shows an illustrative 7-bit Fibonacci LFSR 300. In an example, the LFSR 300 is, or is part of, the LFSR 110 of FIG. 1. In an example, the LFSR 300 is, or is part of, the LFSR 202 of FIG. 2A. In an example, the LFSR 300 is, or is part of, the LFSR 202 of FIG. 2C. In an example, the LFSR 300 comprises a reset zero input 301, a clock input 302, a 7-bit parallel output 303, a first register 304, a second register 306, a third register 308, a fourth register 310, a fifth register 312, a sixth register 314, and a seventh register 316. In an example, each of the registers 304-316 is a flip-flop. The output of the seventh register 316 is connected to the input of the sixth register 314. The output of the sixth register 314 is connected to the input of the fifth register 312. The output of the fifth register 312 is connected to the input of the fourth register 310. The output of the fourth register 310 is connected to the input of the third register 308. The output of the third register 308 is connected to the input of the second register 306. The output of the second register 306 is connected to the input of the first register 304. The output 324 of the first register 304 and the output 322 of the seventh register 316 are processed in an exclusive or operation (XORed) by an XOR gate 320 (input connections to the XOR gate 320 are omitted from FIG. 3 for clarity) to determine the input to the seventh register 316.

The LFSR 300 is configured to be loaded with an initial seed value on power up of the device or if a reset is performed. In some examples, the seed value is any 7 bit value, excluding b0000000. While not illustrated as coupled to the registers 304-316 in FIG. 3 to avoid cluttering the figure, in an example the reset zero input 301 is coupled to a set or a reset input of the registers 304-316. As illustrated in FIG. 3, the seventh register 316 is configured to set its Q output to logic high when the reset zero input 301 is set to logic low and the first through sixth registers 304-314 are configured to set their Q outputs to logic low when the reset zero input 301 is set to logic low. Thus, the illustrative 7-bit Fibonacci LFSR 300 of FIG. 3 is depicted as configured to initialize with a seed value of b1000000. In other examples, the 7-bit Fibonacci LFSR 300 is configured to initialize with a different seed value different from b1000000 and different from b0000000.

Figure 4:
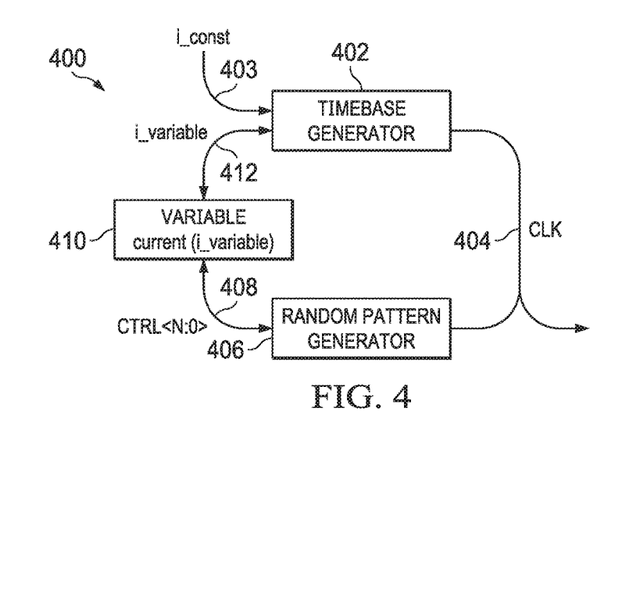
FIG. 4 shows a timebase generator processing method in accordance with various examples.

FIG. 4 is a flowchart of an illustrative process 400 of generating the clock output or the switching signal of the timebase generator 200 of FIG. 2A or of timebase generator 102 of FIG. 1. The process 400 continuously repeats while operating the timebase generator 102, 200 and while operating the switch mode DC-to-DC converter 100. At block 402, a timebase generator determines a clock period as a function of a constant current 403 and of a variable current 412, such as those produced by current sources 212, 214 in FIG. 2A. This clock period controls a clock 404 that has a frequency equal to the reciprocal of the period determined at block 402. The clock period is changing on each cycle through the loop of the process 400. In an example, the clock switches from low to high and back to low only one time during each cycle through the loop of the process 400.

The clock 404 controls a random pattern generator at block 406 to set a control value 408 to a newly calculated control value. In an example, the random pattern generator is a LFSR, such as those described above. In an example, the random pattern generator is a Fibonacci LFSR. In an example, the random pattern generator is one of a 7-bit Fibonacci LFSR, a 9-bit Fibonacci LFSR, an 11-bit Fibonacci LFSR, a 15-bit Fibonacci LFSR, or a 17-bit Fibonacci LFSR. In an example, the random pattern generator is a Galois LFSR. In some examples, the LFSR is configured to generate a maximum length sequence of pseudo-random values, none of which repeats during the maximum length cycle. At the end of the sequence of values, the sequence starts a new cycle, starting from the initial value of the sequence. Any initial seed value can be established for the LFSR, excepting a 0 value (b00 . . . 0). In another example, the random pattern generator 406 is a different component or circuit from the LFSR, for example a different digital pseudo-random number generator component.

The control value 408 controls the variable current 410, where, in at least some examples, the amplitude of the variable current is a linear function of the control value 408. This variable current is output 412 that causes the timebase signal to switch at a rate determined in part by the output 412. As the clock 404 pulses high and back low, the LFSR shifts values through its registers and sets a different value, the different value establishes a different variable current, and the different variable current changes the clock period in the next cycle through the loop of the process 400.

Figure 5:
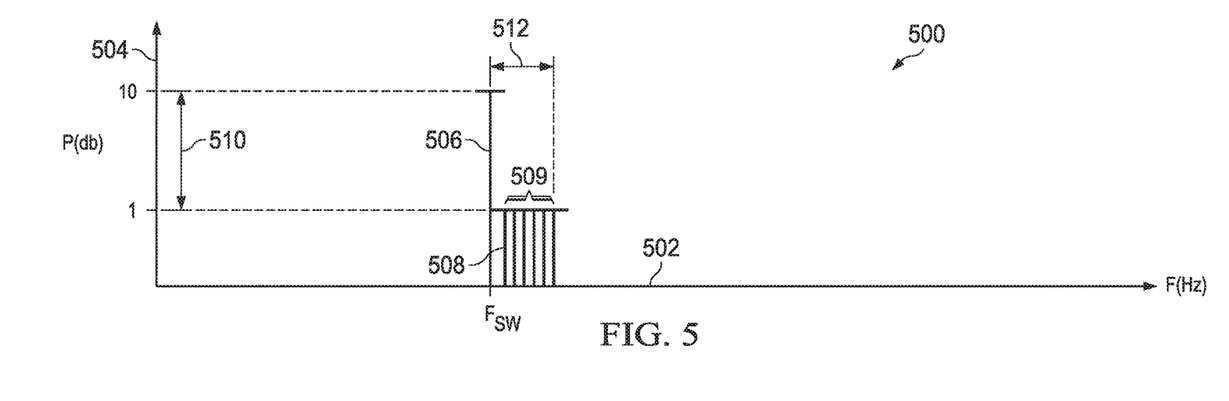
FIG. 5 shows a comparison between switching noise using a constant switching frequency and switching noise using a varying switching frequency in accordance with various examples.

FIG. 5 compares illustrative switching noise associated with a constant frequency switching signal and switching noise associated with a varying frequency switching signal. An illustrative graph 500 comprises an X-axis 502 that represents frequency and a Y-axis 504 that represents power in a log base 10 scale. A first trace 506 represents the switching noise in a conventional switch mode DC-to-DC converter at the switching frequency Fsw. A second trace 508 is an example trace of multiple traces 509 that result from spreading the switching signal to multiple different frequencies as described herein. While only a few traces of the varying frequency switching noise are illustrated in FIG. 5, in some examples the number of the plurality of traces 509 equals the number of different values output by the LFSR in the timebase generator 102, 200.

While not illustrated as such in FIG. 5, the energy associated with the switching noise in a conventional switch mode DC-to-DC converter is not generated at a single frequency (e.g., trace 506) but is a narrowly distributed noise centered on the switching frequency and having a cone shaped distribution (e.g., when switching noise amplitude is represented in the frequency domain by a graph or trace), with a high value sharply sloping downward in amplitude to the lower frequency side and to the higher frequency side of the nominal switching frequency. This is because the frequency of switching in the conventional switch mode DC-to-DC converter is not perfectly timed but is subject to slight frequency variation. Likewise, the noise energies associated with the second trace 508 and the multiple traces 509 are not generated at a single frequency but are narrowly distributed noise centered on the multiple switching frequencies and having cone shaped distributions. This cone shape of switching noise is not represented in FIG. 5 in order to simplify the illustration and discussion. However, in the case of the traces 509, the low noise energy "shoulders" of the traces 509 overlap in the center of the switching frequency range and increase the cumulative noise in the mid-range of the switching frequencies versus the noise near the low-range and near the high-range of the switching frequencies.

In an example, the multiple traces 509 comprise 127 traces, 511 traces, 2047 traces, 32767 traces, 131071 traces, or some other number of traces. The second trace 508 represents the switching noise in the switch mode DC-to-DC converter 100 described above at a single frequency among multiple switching frequencies. The difference in power between the switching noise in a conventional switch mode DC-to-DC converter (first trace 506) and the switching noise in traces 509 when spreading the switching signal frequencies is illustrated as difference 510 (Y-axis is log base 10 scale). The spread of switching signal frequencies is illustrated as the spread switching signal frequency bandwidth 512.

While only a few traces of the varying frequency switching noise are illustrated in FIG. 5, in some examples the number of traces equals the number of different values output by the LFSR in the timebase generator 102, 200. For example, when using a 7-bit Fibonacci LFSR, as illustrated in FIG. 3, 127 traces would be present. Because the sum of the noise energy in the frequency spread of all the 127 traces would be approximately equal to the amplitude of the first trace 506, the noise energy of each of the 127 traces would be diminished. (The scale of the Y-axis 504 is log base 10 scale for clarity.) In a theoretical maximum, the energy in the frequency spread switching signal would be 1/127 or −21 dB (e.g., $(10 \log(1/127)) = -21$ dB) relative to the energy of the noise in the non-spread noise spur. In practice, less than the theoretical maximum energy attenuation would be expected.

In an example, the distance between the traces 509 and hence the total variation of the frequency of the switching signal is determined, at least in part, by the range of varying current output by the varying current source 214 in response to the output of the LFSR 202. The greater the maximum output of the varying current source 214, the wider the variation in frequency of the switching signal. In an example, the frequency varies less than 10% of a target switching frequency. In an example, the target frequency is the frequency of an unmodulated time base generator. For example, if the target frequency is 3 MHz, the switching signal ranges over a frequency bandwidth of less than 10% of 3 MHz or less than 300 kHz. For example, the switching frequency varies from 2.7 MHz to 3 MHz, from 2.85 MHz to 3.15 MHz, from 3 MHz to 3.3 MHz, or over smaller bandwidths. In an example, if the switching signal is varied over a range greater than 15%, the performance of the switch mode DC-to-DC converter 100 is degraded. In an example, if the switching signal is varied over a range greater than 10%, the performance of the switch mode DC-to-DC converter 100 is degraded. In an example, if the switching signal is varied over a range greater than 8%, the performance of the switch mode DC-to-DC converter 100 is degraded. In an example, if the switching signal is varied over a range greater than 6%, the performance of the switch mode DC-to-DC converter 100 is degraded.

Figure 6:
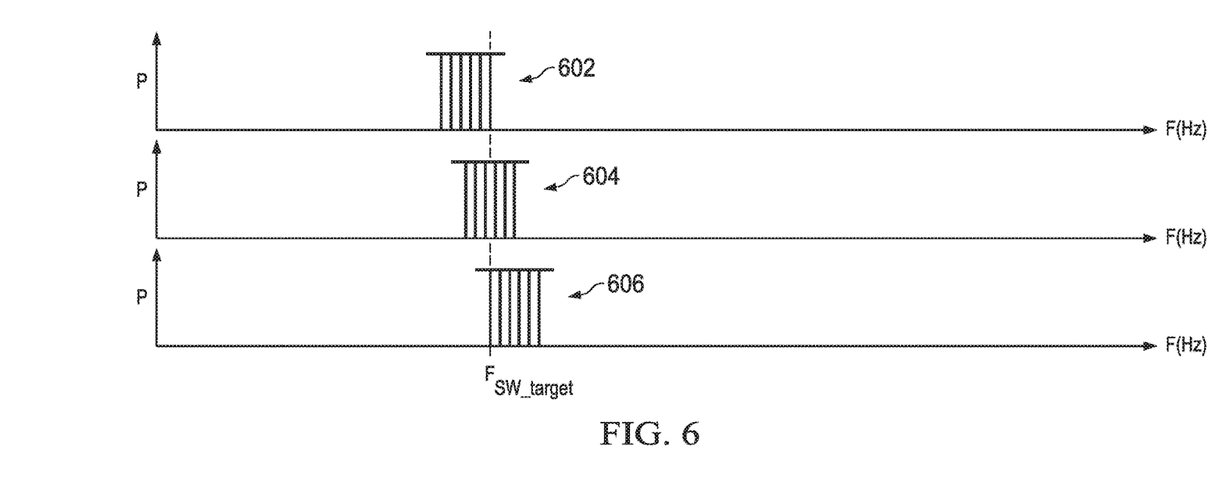
FIG. 6 shows adaptations of varying switching frequency in accordance with various examples.

FIG. 6 shows the frequency bandwidth of the switching signal varying from a minimum frequency to a maximum frequency, where the maximum frequency in the first multiple traces 602 is the target switching frequency. In a second multiple traces 604, the switching signal varies from a minimum frequency to a maximum frequency, where the target switching frequency is in about the middle of the varying switching signal frequency bandwidth. In a third multiple traces 606, the switching signal varies from a minimum frequency that is the target switching frequency to a maximum frequency.

The different multiple traces 602, 604, 606 can be established by varying the fixed current output of the constant current source 212 in FIG. 2A. In the first multiple traces 602, the constant current source is set to the level of the lowest frequency. In the third plurality of traces 606, the constant current source is set to the level associated with the target switching frequency. In the second multiple traces 604, the constant current source is set to a level between the levels of the first multiple traces 602 and the third multiple traces 606. The structure of the timebase generator 200 is flexible and can be adapted by designers to achieve different switching frequencies and different switching frequency bandwidths (the range of variation of switching signal frequency).

Referring to FIG. 2A and FIG. 2C, in an example, the varying current source 214 is implemented by multiple separate varying current source components, where each separate varying current source component is switched on or off by one of the output bits of the N-bit LFSR 202. The number of varying current source components is equal to the number N of the N-bit LFSR 202.

In an example, the constant current source 212 is configured to output 10 µA (microamps), a first component of the varying current source 214 is configured to output 6.3 nA (nanoamps), a second component of the varying current source 214 is configured to output 12.6 nA, a third component of the varying current source 214 is configured to output 25.2 nA, a fourth component of the varying current source 214 is configured to output 50.4 nA, a fifth component of the varying current source 214 is configured to output 100.8 mA, a sixth component of the varying current source 214 is configured to output 201.6 nA, and a seventh component of the varying current source 214 is configured to output 403.2 nA. Each of the components of the varying current source 214 turns on and off based on a corresponding bit in the output of the LFSR 202. When none of the component current sources of the varying current source 214 is turned on, the output of the varying current source 214 is zero, the capacitor 216 is charged only by the constant current source 212, the period of the clock 208 is longer, and the frequency of the switching signal is lower. When all of the component current sources of the varying current source 214 are switched on (e.g., the LFSR 202 outputs the value b1111111=127), the capacitor 216 is charged by about 10 µA current from the constant current source 212 and by about 800 nA current from the varying current source 214, the period of the clock 208 is shorter, and the frequency of the switching signal is higher. In different examples, different amounts of current are sourced by the constant current source 212 and by the component current sources of the varying current source 214.

Figure 7A:
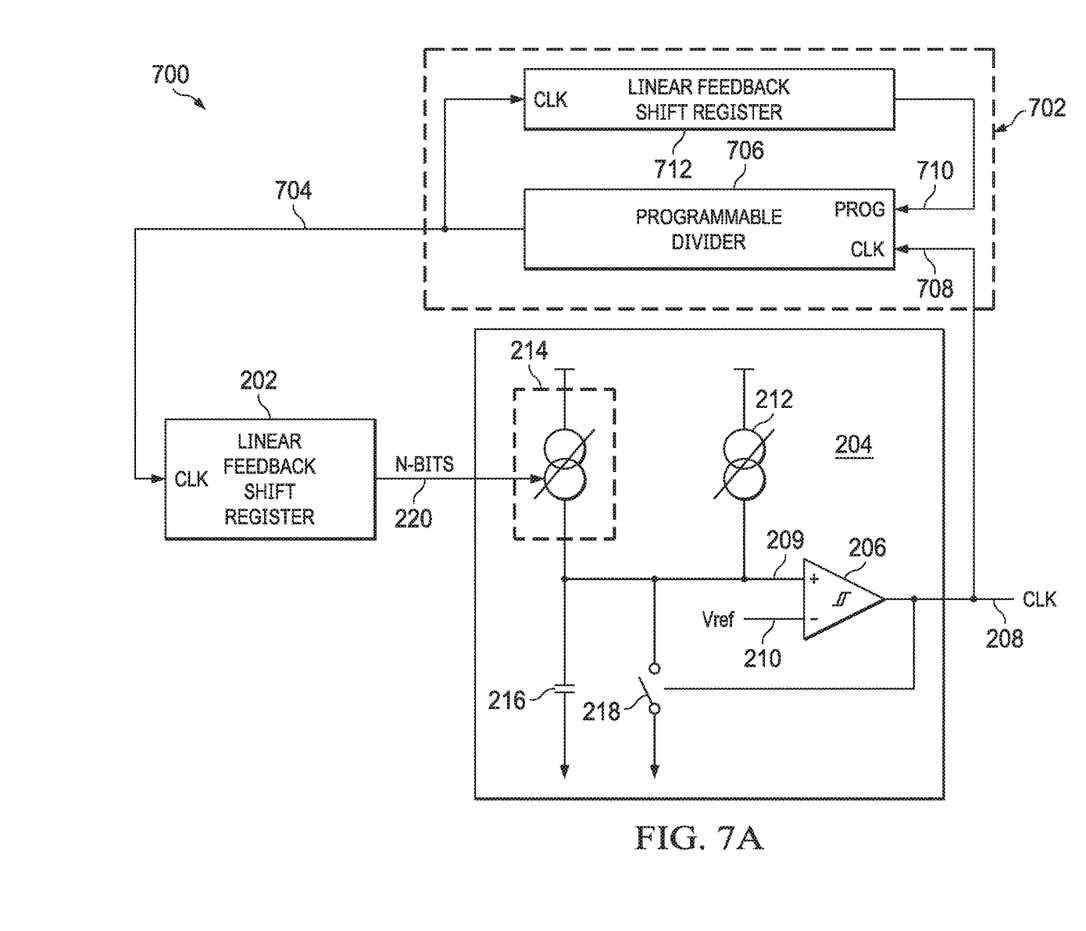
FIG. 7A shows a timebase generator including a programmable digital divider in accordance with various examples.

Turning now to FIG. 7A, a timebase generator 700 is described. The timebase generator 700 is substantially similar to the timebase generator 200 described above, with the difference being that the digital divider 211 of FIG. 2A is replaced by a digital divider 702 that provides a varying integer division of the clock signal 208 (also referred to herein as a timebase or timebase signal) produced by the signal generator 204 and outputs a divided timebase signal 704 to the clock input of the LFSR 202. In an example, the digital divider 702 comprises a programmable divider 706 and a LFSR 712. The clock signal 208 output by the signal generator 204 is coupled to a clock input 708 of the programmable divider 706. The output 704 of the programmable divider 706 is coupled to a clock input of the LFSR 202 and to a clock input of the LFSR 712. An output of the LFSR 712 is coupled to a programming input 710 of the programmable divider 706. In some contexts, the output of the LFSR 712 is referred to as a program command.

The divided timebase signal 704 output by the digital divider 702 causes the LFSR 202 to change the timebase control word 220 less frequently than the period of the timebase signal 208. In an example, the time interval at which the LFSR 202 changes the timebase control word 220 introduces noise and/or electromagnetic interference (EMI) in the switch mode DC-to-DC converter IC 100 at a frequency associated with that time interval. By varying the integer division of the time base signal 208 provided by the digital divider 702, this noise associated with the time interval of changing timebase control word 220 is spread in frequency, thereby reducing the amplitude of this noise at any specific frequency of changing the timebase control word 220.

In an example, the programmable divider 706 is configured to digitally divide a signal received on its clock input 708 by an integer value configured according to a signal received on its programming input 710. In an example, the programmable divider 706 is configured to be programmable to divide by two or more of the integers 2, 3, 4, 5, 6, 7, 8, 9, 10, 11, or 12. In an example, the programmable divider 706 is configured to be programmable to divide by two or more of the integers 13, 14, 15, 16, 17, 18, 19, or 20. In an example, the programmable divider 706 is configured to be programmable to divide by some other set of integers.

In an example, the LFSR 712 is a Fibonacci LFSR. In an example, the LFSR 712 is a Galois LFSR. In an example, the LFSR 712 is a 3-bit LFSR, a 5-bit LFSR, a 7-bit LFSR, a 9-bit LFSR, an 11-bit LFSR, a 15-bit LFSR, or a 17-bit LFSR. In an example the output of the LFSR 712 controls the programming of the programmable divider 706. The LFSR 712 operates substantially similarly to the LFSR 202 described above, generating a sequence of pseudo-random values in response to receiving the divided timebase 704 on its clock input. In an example, the number of registers in the LFSR 712 is different from the number of registers in the LFSR 202. In an example, the LFSR 712 having N registers is configured to generate a maximum length sequence of N-bit values. In other examples, the LFSR 712 having N registers is not configured to generate a maximum length sequence of N-bit values.

Figure 7B:
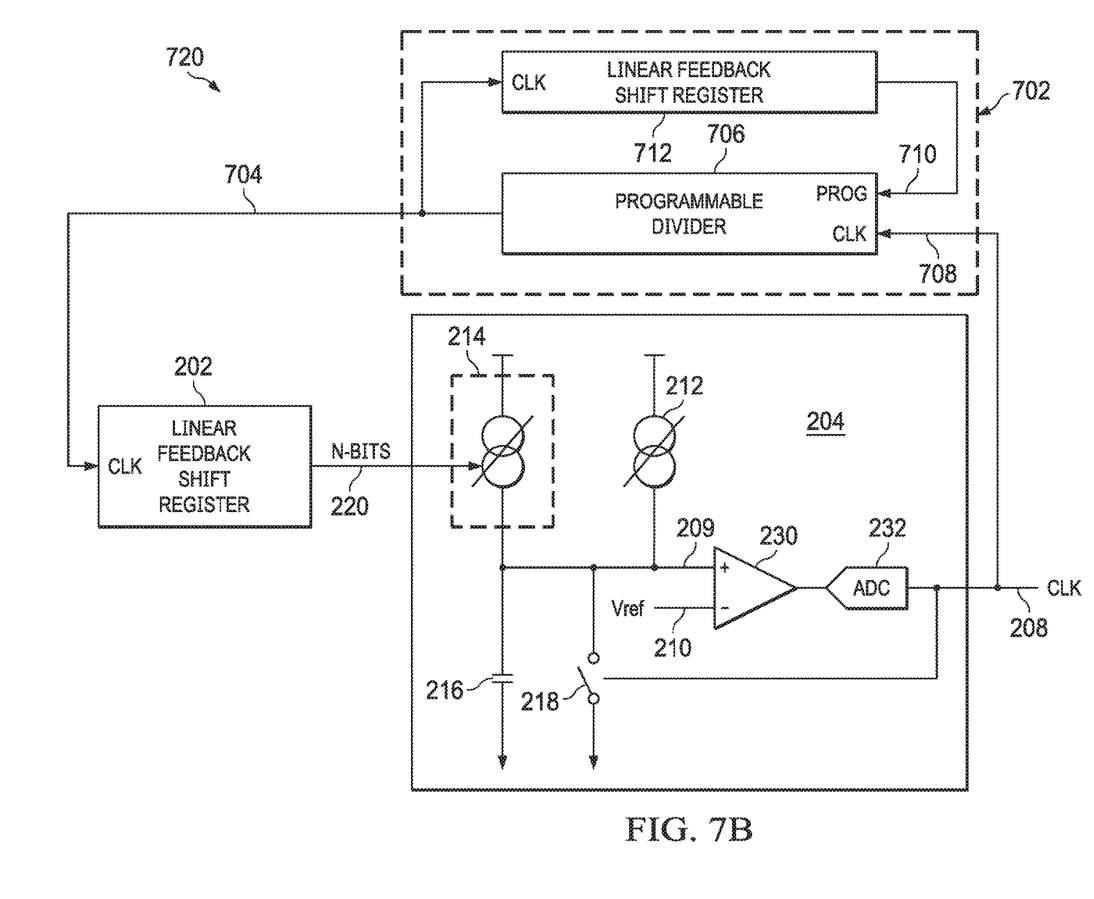
FIG. 7B shows another timebase generator including a programmable digital divider in accordance with various examples.

FIG. 7B shows a timebase generator 720 that is substantially similar to the timebase generator 700 described above with reference to FIG. 7A, with the difference being that the clock signal 208 is produced by the combination of a differential amplifier 230 and an analog-to-digital converter (ADC) 232. The differential amplifier 230 is coupled to the first lead of the capacitor 216 on its first input 209 and is coupled to a voltage reference at its second input 210. The differential amplifier 230 outputs an analog signal that is based on its first and second inputs to the ADC 232, and the ADC 232 produces the clock signal 208 that feeds back into the digital divider 706 (e.g., into the clock input 708 of the programmable divider 706).

Figure 7C:
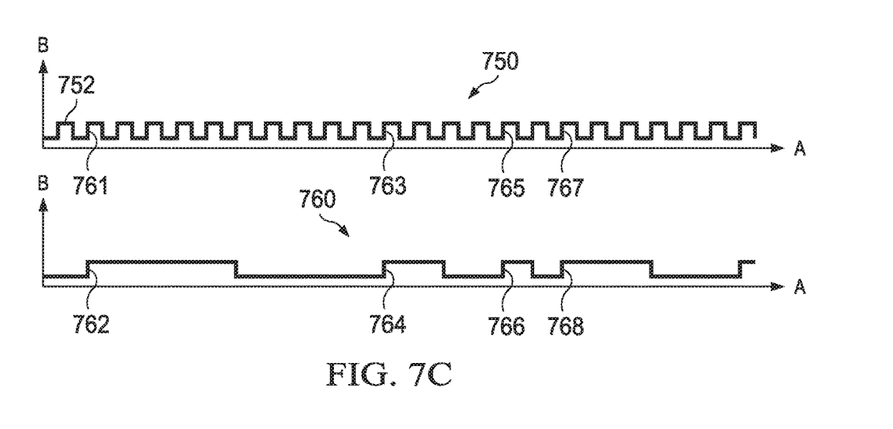
FIG. 7C shows a timebase waveform and a divided timebase waveform in accordance with various examples.

FIG. 7C shows a timebase 750 and a divided timebase 760. The timebase 750 as illustrated comprises pulses 752 that are equally spaced along a horizontal axis labeled A, where displacement along the horizontal A axis is normalized to the width of the pulses 752, where the time durations of some of the pulses 752 are different. The vertical axis B represents the logic value of the pulses and corresponds to a voltage value of the corresponding logic values. FIG. 7C depicts the relationship between the timebase 750 and the divided timebase 760. In an example, the time intervals between the pulses 752 vary as a function of the divided timebase 760 as described above with reference to FIG. 7A and FIG. 7B.

As an example, the programmable divider 706 is initially programmed to divide the timebase 750 by switching from logic high to logic low after 5 periods of the timebase 750 and switching from logic low to logic high after the next 5 periods of the timebase 750 during a first period 762 of the divided timebase 760. In an example, the programmable divider 706 responds to the rising edge of the pulses of the timebase 750. Thus, the programmable divider 706 responds to a first rising edge 761 of the timebase 750 by switching from logic low to logic high at the start of a first period 762 of the divided timebase 760. In an example, the first rising edge 761 of the timebase 750 causes the programmable divider 706 to be programmed to switch from logic high to logic low after 5 periods and to switch from logic low to logic high after the next 5 periods of the timebase 750.

On a second rising edge 763 of the timebase 750 the programmable divider 706 is reprogrammed to divide the timebase 750 during a second period 764 of the divided timebase 760 by switching from logic high to logic low after 2 periods of the timebase 750 and switching from logic low to logic high after the next 2 periods of the timebase 750. The programmable divider 706 also switches from logic low to logic high in response to the second rising edge 763 of the timebase 750. On a third rising edge 765 of the timebase 750 the programmable divider 706 is reprogrammed to divide the timebase 750 during a third period 766 of the divided timebase 760 by switching from logic high to logic low after 1 period of the timebase 750 and switching from logic low to logic high after the next 1 period of the timebase 750. The programmable divider 706 also switches from logic low to logic high in response to the third rising edge 765 of the timebase 750. On a fourth rising edge 767 of the timebase 750 the programmable divider 706 is reprogrammed to divide the timebase 750 during a fourth period 768 of the divided timebase 760 by switching from logic high to logic low after 3 periods of the timebase 750 and switching from logic low to logic high after the next 3 periods of the timebase 750. The programmable divider 706 also switches from logic low to logic high in response to the fourth rising edge 767 of the timebase 750. In this way, the programmable divider 706 outputs the divided timebase 760 synchronized to the rising edges of the timebase 750, where the periods of the divided timebase 760 vary.

In this example, the LFSR 712 is configured to program the programmable divider 706 to four different values of division. In different examples, the LFSR 712 is configured to program the programmable divider 706 to fewer than four different values of division or more than four values of division. As the timebase 750 continues generating pulses 752, the divided timebase 760 will repeat the sequence of divided time pulses 762, 764, 766, 768. In different examples, the values of integer division provided by the programmable divider 706 are different.

The divided timebase 760 is also provided to the clock input of the LFSR 202 described above with reference to FIG. 7A and FIG. 7B. The rising edge of each of the divided timebase periods 762, 764, 766, 768 causes the LFSR 202 to generate a different timebase control word 220 which, in turn, causes the frequency of the pulses of the timebase 750 to change (e.g., causes a duration of the pulses of the timebase 750 to change). Because the LFSR 202 does not change the value of the timebase control word 220 on each rising edge of the timebase 750 (e.g., because of the division of the timebase 750 by the programmable divider 706), the frequency of the timebase 750 remains unchanged through several clock cycles. While represented as square wave pulses in FIG. 7C, in an example the timebase pulses 750 have other rectangular shapes or are triangular shaped, saw tooth shaped, sinusoidally shaped, or other shaped.

Figure 8:
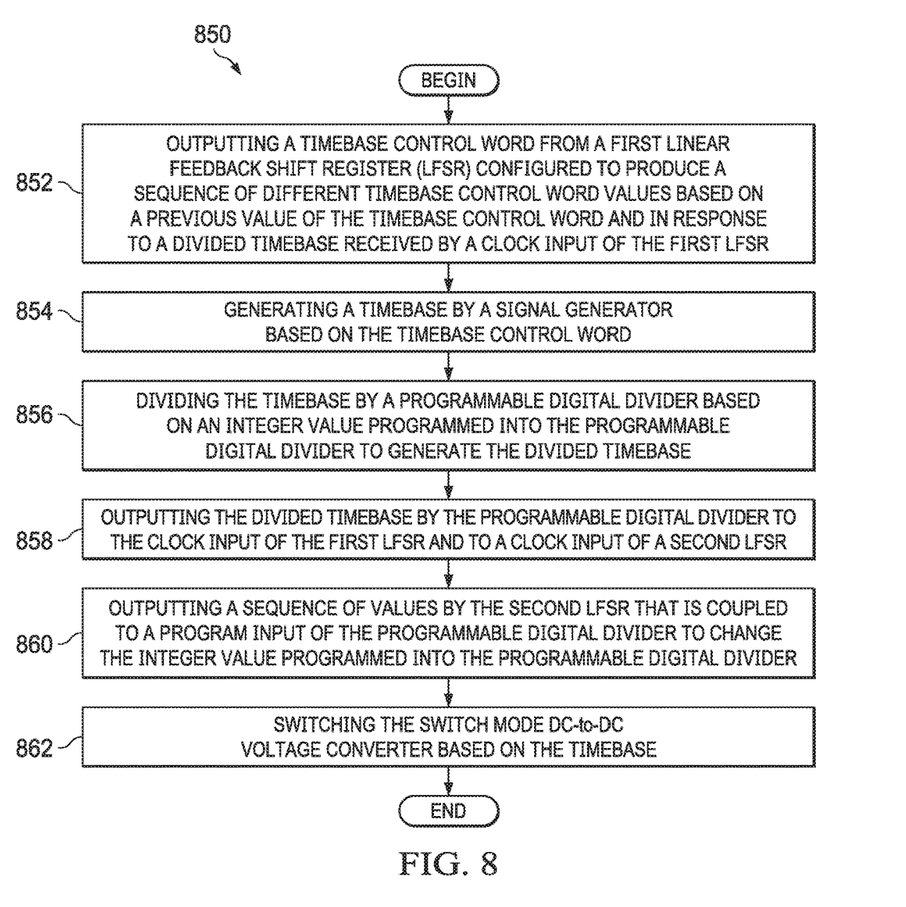
FIG. 8 is a flow chart for operating a switch mode DC-to-DC converter in accordance with various examples.

Turning now to FIG. 8, a method 850 of operating a switch mode direct current to direct current (DC-to-DC) voltage converter is described. At block 852, the method 850 comprises outputting a timebase control word from a first linear feedback shift register (LFSR) configured to produce a sequence of different timebase control word values based on a previous value of the timebase control word and in response to a divided timebase received by a clock input of the first LFSR. At block 854, the method 850 comprises generating a timebase by a signal generator based on the timebase control word. At block 856, the method 850 comprises dividing the timebase by a programmable digital divider based on an integer value programmed into the programmable digital divider to generate the divided timebase. At block 858, the method 850 comprises outputting the divided timebase by the programmable digital divider to the clock input of the first LFSR and to a clock input of a second LFSR.

At block 860, the method 850 comprises outputting a program command by the second LFSR to a program input of the programmable digital divider to change the integer value programmed into the programmable digital divider. In an example, the program command output by the second LFSR is a pseudo-random sequence of values (e.g., a sequence of program command values). As the processing of blocks 858 and 860 are repeated, the integer value programmed into the programmable digital divider is changed. At block 862, the method 850 comprises switching the switch mode DC-to-DC voltage converter based on the timebase.

Figure 9:
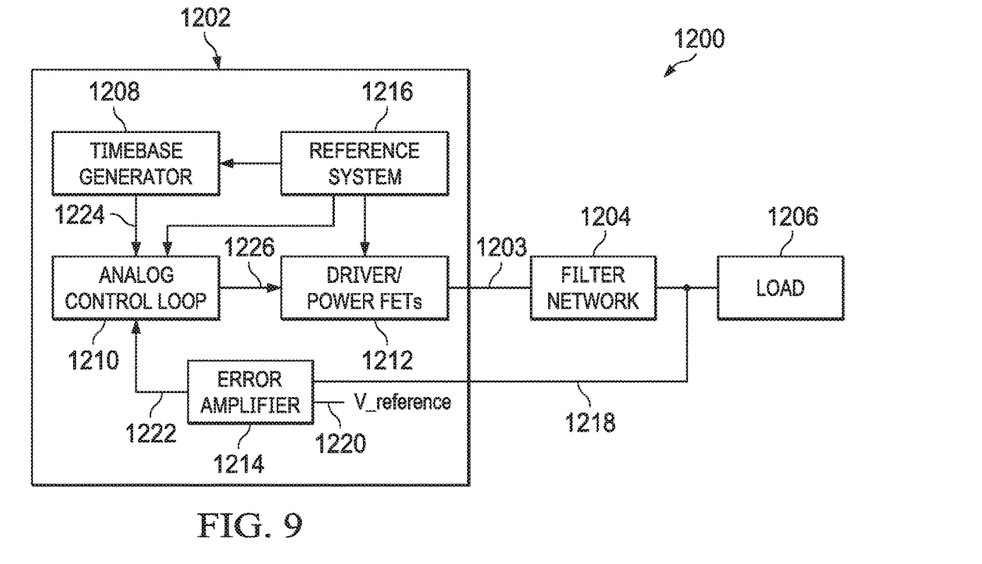
FIG. 9 shows a block diagram of a switch mode DC-to-DC converter in accordance with various examples.

FIG. 9 shows a block diagram of an illustrative system 1200. The system 1200 provides an example of how a switch DC-to-DC converter IC is used in an electronic system. In an example, the system 1200 comprises a switch mode DC-to-DC converter IC 1202 outputting a DC voltage 1203 to a filter network 1204 that supplies filtered DC power to a load 1206. In an example, the system 1200 is a mobile phone, a computer in a motor vehicle, a head-unit in a motor vehicle, an electronic module in a motor vehicle, or another electronic device. In an example, the teachings of the present disclosure reduce electromagnetic interference (EMI) in these electronic systems by attenuating the switching noise through spreading the switching frequency as described herein. The system 1200 comprises other components that are not illustrated in FIG. 9. The filter network 1204 comprises inductors and capacitors to establish a filter. In an example, the load 1206 is an electronic device or an electromechanical device that relies upon stable DC voltage power. In an example, the load 1206 is a display screen of an electronic device, a microprocessor of an electronic device, a digital signal processor of an electronic device, an analog-to-digital converter (ADC), a power amplifier, a radio frequency power amplifier (RFPA), a radio transceiver of an electronic device, a vibrator motor of an electronic device, or yet other items.

The switch mode DC-to-DC converter IC 1202 comprises a timebase generator 1208, an analog control loop 1210, a DC output driver 1212, an error amplifier 1214, and a reference system 1216. In embodiments, the switch mode DC-to-DC converter IC 1202 has more or fewer components. The voltage output by the filter network 1204 to the load 1206 is fed back into the switch mode DC-to-DC converter IC 1202 to the error amplifier 1214 as feedback 1218 to promote the switch mode DC-to-DC converter IC 1202 meeting its DC output voltage specifications. In an example, the reference system 1216 provides bias voltages in the DC-to-DC converter IC 1202. The error amplifier 1214 is configured to amplify the difference between the feedback 1218 and a voltage reference 1220. An error signal 1222 is output by the error amplifier 1214 to the analog control loop 1210 which uses this error signal 1222 to adapt its drive signal 1226 to the DC output driver 1212.

The timebase generator 1208 outputs a switching signal 1224 to the analog control loop 1210, and this switching signal 1224 and the output of the error amplifier 1214 are used to generate the desired DC voltage of the DC-to-DC converter IC 1202. In an example, the timebase generator 1208 is implemented as described above.

Figure 10:
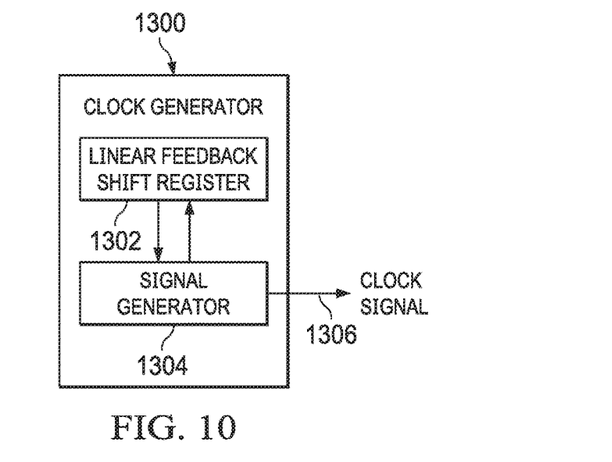
FIG. 10 shows a clock generator in accordance with various examples.

FIG. 10 shows a clock generator IC 1300. In an example, the clock generator IC 1300 provides a clock signal 1306 to electronic components in an electronic device, for example to microprocessors (MPUs), to digital signal processors (DSPs), to graphical processing units (GPUs), to field programmable gate arrays (FPGAs), to complex programmable logic devices (CPLDs), to programmable logic devices (PLDs), to application specific integrated circuits (ASICs), dynamic random access memories (DRAMs), phase locked loops (PLLs), and to other electronic devices. The aforementioned approach to spreading the spectrum of switching noise by dithering or varying the frequency of the clock is applicable to the clock generator IC 1300 as well. In an example, the clock generator IC 1300 comprises a LFSR 1302 that is coupled to a signal generator 1304. In an example, the LFSR 1302 and signal generator 1304 are implemented and operated similarly to the timebase generator 102 and 200 described above.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An integrated circuit, comprising:
   a timebase generator that comprises:
      a first linear feedback shift register (LFSR);

a signal generator having an input coupled to an output of the first LFSR; and a digital divider comprising a second LFSR and a programmable digital divider, wherein a clock input of the programmable digital divider is coupled to an output of the signal generator, wherein an output of the programmable digital divider is coupled to a clock input of the first LFSR and is coupled to a clock input of the second LFSR, and wherein an output of the second LFSR is coupled to a program input of the programmable digital divider; and a switch mode direct current-to-direct current (DC-to-DC) voltage converter coupled to the timebase generator.

2. The integrated circuit of claim 1, wherein the second LFSR is a Fibonacci LFSR.

3. The integrated circuit of claim 1, wherein the second LFSR is a Galois LFSR.

4. The integrated circuit of claim 1, wherein the first LFSR is a 7-bit LFSR.

5. The integrated circuit of claim 1, wherein the signal generator comprises a varying current source coupled to the output of the first LFSR and coupled to the output of the signal generator.

6. The integrated circuit of claim 5, wherein the signal generator comprises a constant current source coupled to the output of the signal generator.

7. A system, comprising:
an integrated circuit, comprising:
a timebase generator that comprises a first linear feedback shift register (LFSR) configured to generate a sequence of timebase control words based on a previous value of the timebase control word and in response to a divided timebase received by a clock input of the first LFSR, a signal generator coupled to the first LFSR and configured to generate a timebase of the timebase generator based on the timebase control words, and a programmable digital divider coupled to the signal generator and to the first LFSR and configured to generate the divided timebase by dividing the timebase by a varying integer value determined based on a program input of the programmable digital divider; and a switch mode direct current-to-direct current (DC-to-DC) voltage converter coupled to the timebase generator and configured to output a DC power based on the timebase generated by the timebase generator.

8. The system of claim 7, wherein the programmable digital divider is configured to receive a pseudo-random sequence of values via the program input.

9. The system of claim 7, wherein the timebase generator further comprises a second LFSR having a clock input coupled to the programmable digital divider, the second LFSR configured to output a pseudo-random sequence of values to the program input of the programmable divider.

10. The system of claim 9, wherein the second LFSR is a Fibonacci LFSR.

11. The system of claim 10, wherein the second LFSR is a 7-bit Fibonacci LFSR.

12. The system of claim 9, wherein the second LFSR is a Galois LFSR.

13. A method of operating a switch mode direct current to direct current (DC-to-DC) voltage converter, comprising:
outputting a timebase control word from a first linear feedback shift register (LFSR) configured to produce a sequence of different timebase control word values based on a previous value of the timebase control word and in response to a divided timebase received by a clock input of the first LFSR;

generating a timebase by a signal generator based on the timebase control word;

dividing the timebase by a programmable digital divider based on an integer value programmed into the programmable digital divider to generate the divided timebase; and changing the integer value programmed into the programmable digital divider based on the divided timebase.

14. The method of claim 13, further comprising:
outputting the divided timebase by the programmable digital divider to the clock input of the first LFSR and to a clock input of a second LFSR;

generating a sequence of program command values by the second LFSR based on a previous value stored in the second LFSR and in response to the divided timebase received by the clock input of the second LFSR; and providing the program command values by the second LFSR to a program input of the programmable digital divider.

15. The method of claim 14, further comprising:
receiving the sequence of values from the second LFSR;
mapping the sequence of values to program commands; and
outputting the program commands to the program input of the programmable digital divider.

16. The method of claim 14, wherein the first LFSR is configured to produce multiple different timebase control word values in a pseudo-random pattern.

17. The method of claim 14, wherein the first LFSR is a Fibonacci LFSR or a Galois LFSR.

18. The method of claim 14, wherein the second LFSR is a Fibonacci LFSR or a Galois LFSR.

19. The method of claim 13, further comprising switching the switch mode DC-to-DC voltage converter based on the timebase.

20. The method of claim 13, wherein the programmable digital divider divides the timebase based on one of multiple different integer values.

* * * * *